No. 856,459. PATENTED JUNE 11, 1907.
G. H. FOLLOWS.
OIL DISTRIBUTING RING.
APPLICATION FILED OCT. 3, 1904.
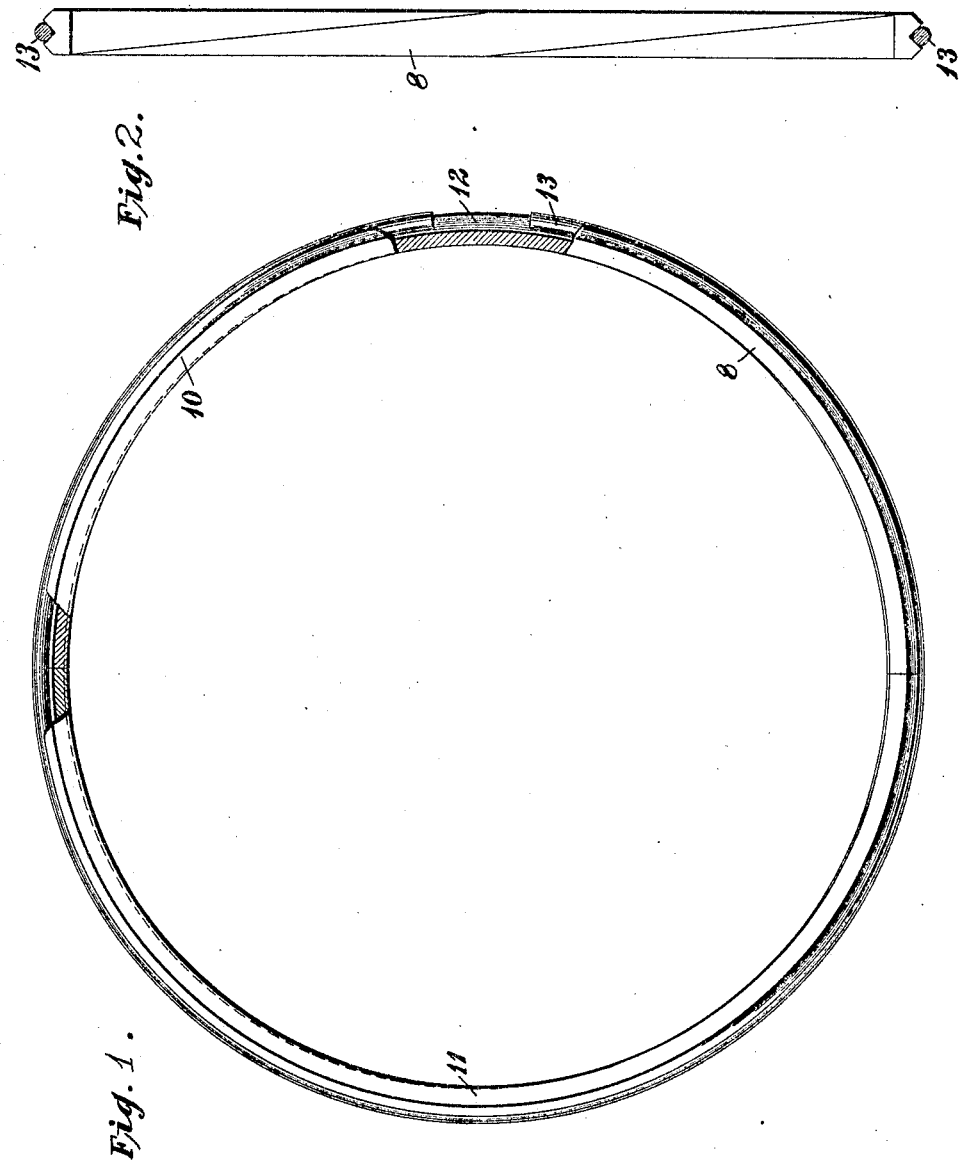

UNITED STATES PATENT OFFICE.

GEORGE H. FOLLOWS, OF PITTSBURG, PENNSYLVANIA, ASSIGNOR TO WESTINGHOUSE ELECTRIC & MANUFACTURING COMPANY, A CORPORATION OF PENNSYLVANIA.

OIL-DISTRIBUTING RING.

No. 856,459.  Specification of Letters Patent.  Patented June 11, 1907.

Application filed October 3, 1904. Serial No. 227,071.

*To all whom it may concern:*

Be it known that I, GEORGE HERBERT FOLLOWS, a subject of the King of Great Britain and Ireland, and a resident of Pittsburg, in the county of Allegheny and State of Pennsylvania, have invented a new and useful Improvement in Oil-Distributing Rings, of which the following is a specification.

My invention relates to means for automatically oiling machine shafts and their bearings, and particularly to the rings employed for continuously applying the oil to the shafts.

The object of my invention is to provide a ring or set of rings for automatically transferring oil from a reservoir or receptacle to the shaft of a machine and distribute it thereon which shall be simple and inexpensive in construction and susceptible of ready application and removal.

It has long been a usual practice to employ self-oiling bearings for the shafts of the rotating parts of machines and such means has comprised a body of oil located in a suitable receptacle below the shaft bearing and rings of greater diameter than the shaft which rest thereon and dip into the body of oil, these rings being given a rotative movement by reason of the frictional engagement with the shaft and thus serving to carry oil to the shaft and keep it and its bearing-boxes constantly lubricated.

My invention pertains to this type of apparatus, and is illustrated in the accompanying drawings, in which Figure 1 is a view, partially in end elevation and partially in section, of an oil-distributing ring constructed in accordance with my invention, and Fig. 2 is a diametral, sectional view of the ring shown in Fig. 1.

Oil distributing rings, as heretofore employed, have generally comprised two or more segments, the abutting ends of which were fastened together by means of splicing strips or tongues and grooves and suitable screws or rivets. Such construction involves considerable labor and difficulty in combining the ring segments and in separating them, in case separation is desired. I simplify the construction and materially reduce the expenditure of labor in assembling and dis-assembling the parts by the construction shown in the drawing.

As here shown, the ring 8 comprises two semi-annular segments 10 and 11, the ends of which abut at diametrically opposite points, but more than two segments may be employed, if desired. Each segment is provided with an outer circumferential groove 12, in which is seated a spring clamping ring 13 that may be formed of any material which will insure the desired degree of resilience.

The parts may be readily assembled, by bringing the ends of the two segments 10 and 11 into engagement and then springing the ring 13 into the groove 12. The separation of the parts may be effected with equal facility and the space between the free ends of the ring 13 may be such as to permit of removing the ring laterally from the shaft which it surrounds, if desired.

I claim as my invention:

1. An oil-distributing ring for shafts, comprising two segments having squarely abutting ends and a spring-ring that surrounds and holds the segments in position.

2. An oil-distributing ring for shafts, comprising two circumferentially grooved segments having squarely abutting ends and a spring-ring seated in the segment grooves.

3. An oil-distributing ring for shafts, comprising a plurality of segments each having a V-shaped groove and a clamping ring removably seated in the segment grooves.

4. An oil-distributing ring for shafts, comprising a plurality of squarely abutting segments having circumferentially alined V-shaped grooves and a spring clamping ring removably seated in said grooves.

In testimony whereof, I have hereunto subscribed my name this 29th day of September, 1904.

GEORGE H. FOLLOWS.

Witnesses:
CHARLES C. LEEDS,
BIRNEY HINNES.